D. J. ANGUS.
POWER FACTOR METER.
APPLICATION FILED FEB. 28, 1919.

1,318,126.

Patented Oct. 7, 1919.

Witness
Frank A. Fahle

Inventor
Donald J. Angus,
By
Attorneys

UNITED STATES PATENT OFFICE.

DONALD J. ANGUS, OF INDIANAPOLIS, INDIANA.

POWER-FACTOR METER.

1,318,126.  Specification of Letters Patent.  Patented Oct. 7, 1919.

Application filed February 28, 1919. Serial No. 279,909.

*To all whom it may concern:*

Be it known that I, DONALD J. ANGUS, a citizen of the United States, residing at Indianapolis, in the county of Marion and State of Indiana, have invented a new and useful Power-Factor Meter, of which the following is a specification.

It is the object of my invention to provide a power-factor meter which requires no relative adjustment between the mechanical positions of its coils, and which may readily be calibrated to suit existing scales, especially in recording meters.

In accomplishing this result I provide two relatively movable members, one of which carries a current coil connected in one of the leads of a three-phase circuit, and the other of which carries two angularly positioned voltage coils rigidly fixed mechanically with relation to each other and having two terminals of the two coils connected to two of the leads of the three-phase circuit and the other two terminals thereof connected to a common point which in turn is connected through a resistance to the third lead, said resistance being calibrated so that such point to which the two terminals of the two voltage coils are connected in common is electrically separated from the neutral point of the electrical system. With this arrangement, the two relatively movable members will take relative positions depending upon the power factor of the circuit.

The accompanying drawing illustrates my invention.

Figure 1:
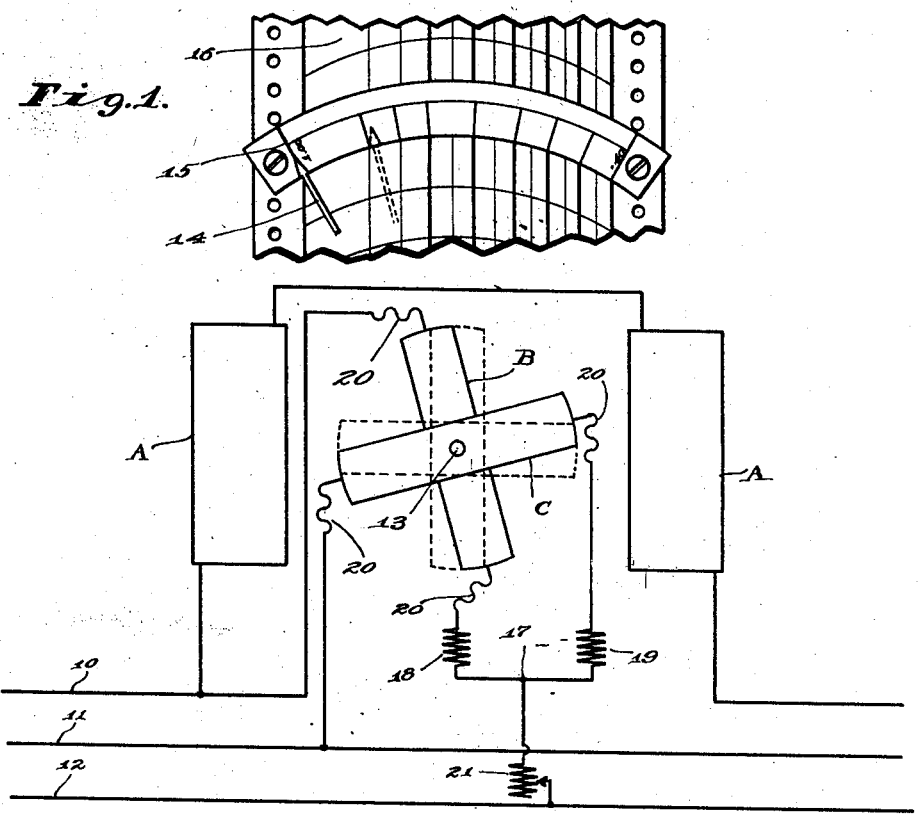
Figure 2:
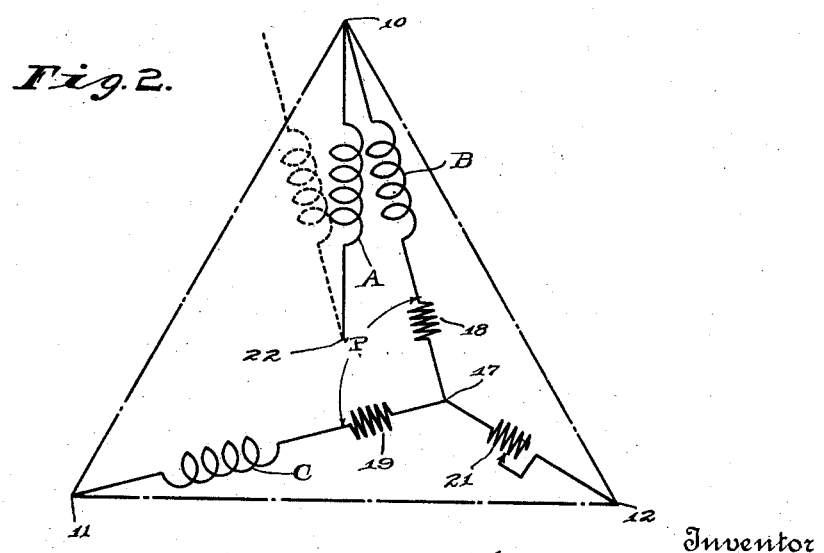

Figure 1 is a semi-diagrammatic plan of a power-factor meter embodying my invention, showing the connections of the coils and their positions when the power factor is 1.00; and Fig. 2 is a three-phase diagram illustrating the electrical connections of the coils and their electrical relationships for 1.00 power factor.

The stator of the instrument is assumed to be the one carrying the current coils A, which are shown as connected in series in one lead—the lead 10—of the three-phase circuit 10—11—12; and the two voltage coils B and C are therefore mounted on the rotor of the instrument, conveniently by being fixed on an arbor 13 which is suitably mounted for rotation and which carries a pointer 14 movable over a scale 15 and provided with any suitable marking device for making a record on the moving chart 16. The arrangement of the pointer, scale, marking device, and chart may be anything desired, as my present invention is not concerned with the details thereof. The voltage coils B and C are rigidly mounted on the arbor 13 in a fixed angular relation to each other, the angle preferably being substantially a right angle, as shown in Fig. 1; this mechanical angle between these two voltage coils is maintained fixed throughout the operation of the instrument, and after once being fixed is not varied even in the calibration of the instrument. The coil B has one terminal connected to the lead 10; and the coil C has one terminal connected to the lead 11. The other two terminals of these two voltage coils B and C are connected to a common point 17; preferably with additional resistances 18 and 19 in the circuits of such coils between the point 17 and the leads 10 and 11 respectively in order to cut down the current consumption of such coils, though such resistances are not essential. The connections to the moving coils B and C may be arranged in any desired manner, as by the usual flexible conductors 20, though this is an incident with which my invention does not concern itself, and other means for connecting the terminals of these moving coils may be used. The point 17 is also connected to the lead 12 through a resistance 21, which is essential, and which may be calibrated so as to bring the point 17 into any desired non-coincident relation to the neutral point 22 of the three-phase system, as is clear from Fig. 2. By thus adjusting the resistance 21 to control the relation of the points 17 and 22, any desired value of the electrical angle P between the currents in the coils B and C may be obtained, as is clear from Fig. 2, thereby changing the scale characteristic of the instrument for purposes of calibration. Perhaps the simplest case, which will be assumed for purposes of explanation, is where the angle P is 90°, as shown, and the ampere turns of the coils B and C are equal; in which case the phase relationships between the current in the coils A, B, and C is as illustrated in Fig.

2, so long as the current in the coil A is in phase with the voltage—that is, so long as the power factor is 1.00.

Under these assumed conditions, with the power factor 1.00, the coils B and C will take the mechanical positions illustrated in Fig. 1—that is, with the mechanical angular relations between the axis of the coil A and the axes of the coils B and C identical with the electrical angles between such coils as illustrated in Fig. 2; the pointer 14 is fixed to the arbor 13 so that under these conditions it indicates "1.00" on the scale 15. The coils B and C take this position automatically because by reason of their mechanical and electrical relationships to the coil A the torque components by such two coils exactly balance with the coils in this position, so that the resultant torque is zero for this position alone, while for any other position of the voltage coils there is a torque which tends to bring the coils into this position.

Assume now that the current in the coil A lags behind the voltage, say 15°, as indicated by the dotted line position of the coil A in Fig. 2. This means a relative electrical displacement between the currents in the coil A and in the coils B and C by the counterclockwise displacement of the current in the coil A, as indicated by the dotted lines in Fig. 2; but as the coil A is fixed in space by being mounted on the stator of the instrument, this same relative displacement in angular relation is obtained by a movement of the rotor—that is, of the coils B and C—in the opposite or clockwise direction through a corresponding angle, or to the dotted line position shown in Fig. 1, in which case the pointer 14 is carried along the scale 15 and the marking device is carried over the moving chart 16 to the point on such scale and chart which correspond to the power factor for a current lag of 15°. This movement of the rotor takes place, because by it the torque components of the two coils B and C, which were thrown out of balance by the assumed phase displacement are brought into balance by such movement. Thus as the power factor changes, or as the time phase relation between the current and voltage changes, the rotor of the instrument will move in a clockwise direction as the current lag increases and in a counterclockwise direction as the current lag decreases, so as to produce the power factor indication on the scale 15 and a time record of the power factor on the moving chart 16.

The scale 15 is marked for indicating the results of lagging currents only; but the action of the device is exactly the same but in the reverse direction for leading currents. If leading currents only are to be indicated, either the scale markings are exactly reversed and the position of the pointer shifted on the arbor, or, more simply, the voltage connections to the leads 11 and 12 are merely interchanged; while if indications of both lagging and leading currents are desired the 1.00 marking is placed at an intermediate point on the scale, and the position of the pointer on the arbor accordingly shifted.

I claim as my invention:

1. A power-factor meter, comprising two relatively movable elements, a current coil on one of said elements, two voltage coils on the other element, said two voltage coils being fixed relatively to each other with a fixed mechanical angle between them and being respectively connected between two leads of the circuit being tested and a common point, and a resistance arranged for calibration and connected between said common point and a third lead of the circuit, said resistance being such that said common point is electrically displaced from the neutral point of the system.

2. A power-factor meter, comprising two relatively movable elements, a current coil on one of said elements, two voltage coils on the other element, said two voltage coils being fixed relatively to each other with a fixed mechanical angle between them and being respectively connected between two leads of the circuit being tested and a common point, and a resistance connected between said common point and a third lead of the circuit, said resistance being such that said common point is electrically displaced from the neutral point of the system.

3. A power-factor meter, comprising two relatively movable elements, a current coil on one of said elements, two voltage coils on the other element, said two voltage coils being relatively fixed at substantially right angles to each other and being respectively connected between two leads of the circuit being tested and a common point, and a resistance arranged for calibration and connected between said common point and a third lead of the circuit, said resistance being such that said common point is electrically displaced from the neutral point of the system.

4. A power-factor meter, comprising two relatively movable elements, a current coil on one of said elements, two voltage coils on the other element, said two voltage coils being relatively fixed at substantially right angles to each other and being respectively connected between two leads of the circuit being tested and a common point, and a resistance connected between said common point and a third lead of the circuit, said resistance being such that said common point is electrically displaced from the neutral point of the system.

5. A power-factor meter, comprising two relatively movable elements, a current coil on one of said elements, two voltage coils on the other element, said two voltage coils being fixed relatively to each other with a fixed mechanical angle between them and being respectively connected between two leads of the circuit being tested and a common point, and a resistance arranged for calibration and connected between said common point and a third lead of the circuit, said resistance being proportioned with respect to the resistance of the two voltage coils so that the electrical angle between the current in the two voltage coils is substantially a right angle.

6. A power-factor meter, comprising two relatively movable elements, a current coil on one of said elements, two voltage coils on the other element, said two voltage coils being fixed relatively to each other with a fixed mechanical angle between them and being respectively connected between two leads of the circuit being tested and a common point, and a resistance connected between said common point and a third lead of the circuit, said resistance being proportioned with respect to the resistance of the two voltage coils so that the electrical angle between the current in the two voltage coils is substantially a right angle.

7. A power-factor meter, comprising two relatively movable elements, a current coil on one of said elements, two voltage coils on the other element, said two voltage coils being relatively fixed at substantially right angles to each other and being respectively connected between two leads of the circuit being tested and a common point, and a resistance arranged for calibration and connected between said common point and a third lead of the circuit, said resistance being proportioned with respect to the resistance of the two voltage coils so that the electrical angle between the current in the two voltage coils is substantially a right angle.

8. A power-factor meter, comprising two relatively movably elements, a current coil on one of said elements, two voltage coils on the other element, said two voltage coils being relatively fixed at substantially right angles to each other and being respectively connected between two leads of the circuit being tested and a common point, and a resistance connected between said common point and a third lead of the circuit, said resistance being proportioned with respect to the resistance of the two voltage coils so that the electrical angle between the current in the two voltage coils is substantially a right angle.

9. A power-factor meter, comprising two relatively movable elements, a current coil on one of said elements, two voltage coils on the other element, said two voltage coils being fixed relatively to each other with a fixed mechanical angle between them and being respectively connected between two leads of the circuit being tested and a common point, and a resistance arranged for calibration and connected between said common point and a third lead of the circuit, said resistance being proportioned with respect to the resistance of the two voltage coils so that the electrical angle between the current in the two voltage coils is an angle which differs from the angle between the phases of the circuit.

10. A power-factor meter, comprising two relatively movable elements, a current coil on one of said elements, two voltage coils on the other element, said two voltage coils being fixed relatively to each other with a fixed mechanical angle between them and being respectively connected between two leads of the circuit being tested and a common point, and a resistance connected between said common point and a third lead of the circuit, said resistance being proportioned with respect to the resistance of the two voltage coils so that the electrical angle between the current in the two voltage coils is an angle which differs from the angle between the phases of the circuit.

11. A power-factor meter, comprising two relatively movable elements, a current coil on one of said elements, two voltage coils on the other element, said two voltage coils being relatively fixed at substantially right angles to each other and being respectively connected between two leads of the circuit being tested and a common point, and a resistance arranged for calibration and connected between said common point and a third lead of the circuit, said resistance being proportioned with respect to the resistance of the two voltage coils so that the electrical angle between the current in the two voltage coils is an angle which differs from the angle between the phases of the circuit.

12. A power-factor meter, comprising two relatively movable elements, a current coil on one of said elements, two voltage coils on the other element, said two voltage coils being relatively fixed at substantially right angles to each other and being respectively connected between two leads of the circuit being tested and a common point, and a resistance connected between said common point and a third lead of the circuit, said resistance being proportioned with respect to the resistance of the two voltage coils so that the electrical angle between the current in the two voltage coils is an angle which differs from the angle between the phases of the circuit.

13. A power-factor meter for three-phase circuits, comprising two relatively movable elements, a current coil on one of said elements, two voltage coils on the other element, said two voltage coils being relatively fixed at substantially right angles to each other and being respectively connected between two leads of the three-phase circuit being tested and a common point, and a resistance arranged for calibration and connected between said common point and the third lead of said circuit.

14. A power-factor meter for three-phase circuits, comprising two relatively movable elements, a current coil on one of said elements, two voltage coils on the other element, said two voltage coils being relatively fixed at substantially right angles to each other and being respectively connected between two leads of the three-phase circuit being tested and a common point, and a resistance connected between said common point and the third lead of said circuit.

15. A power-factor meter, comprising two relatively movable elements, a current coil on one of said elements, two voltage coils on the other element, said two voltage coils being fixed relatively to each other at a fixed mechanical angle between them and being respectively connected between two leads of the circuit being tested and a common point, and means for maintaining said common point electrically displaced from the neutral point of the system and the currents in the two voltage coils electrically displaced from each other.

16. A power-factor meter, comprising two relatively movable elements, a current coil on one of said elements, two voltage coils on the other element, said two voltage coils being relatively fixed at substantially right angles to each other and being respectively connected between two leads of the circuit being tested and a common point, and means for maintaining said common point electrically displaced from the neutral point of the system and the currents in the two voltage coils electrically displaced from each other.

17. The method of exciting a polyphase power-factor meter, which consists in exciting two relatively fixed coils angularly displaced from each other from two leads of a polyphase circuit, and adding a component of current from a third lead to vary the angular relation between the currents passing through such coils.

18. The method of calibrating a polyphase power-factor meter, which consists in exciting two relatively fixed coils angularly displaced from each other from two leads of a polyphase circuit, adding a component of current from a third lead to vary the angular relation between the currents passing through such coils, and varying the component taken from the third lead to obtain the desired calibration.

In witness whereof, I have hereunto set my hand at Indianapolis, Indiana, this 26th day of February, A. D. one thousand nine hundred and nineteen.

DONALD J. ANGUS.

Copies of this patent may be obtained for five cents each, by addressing the "Commissioner of Patents, Washington, D. C."